July 28, 1925.
G. A. LYON
BUFFER ATTACHING DEVICE
Filed Oct. 15, 1923
1,547,816
2 Sheets-Sheet 1
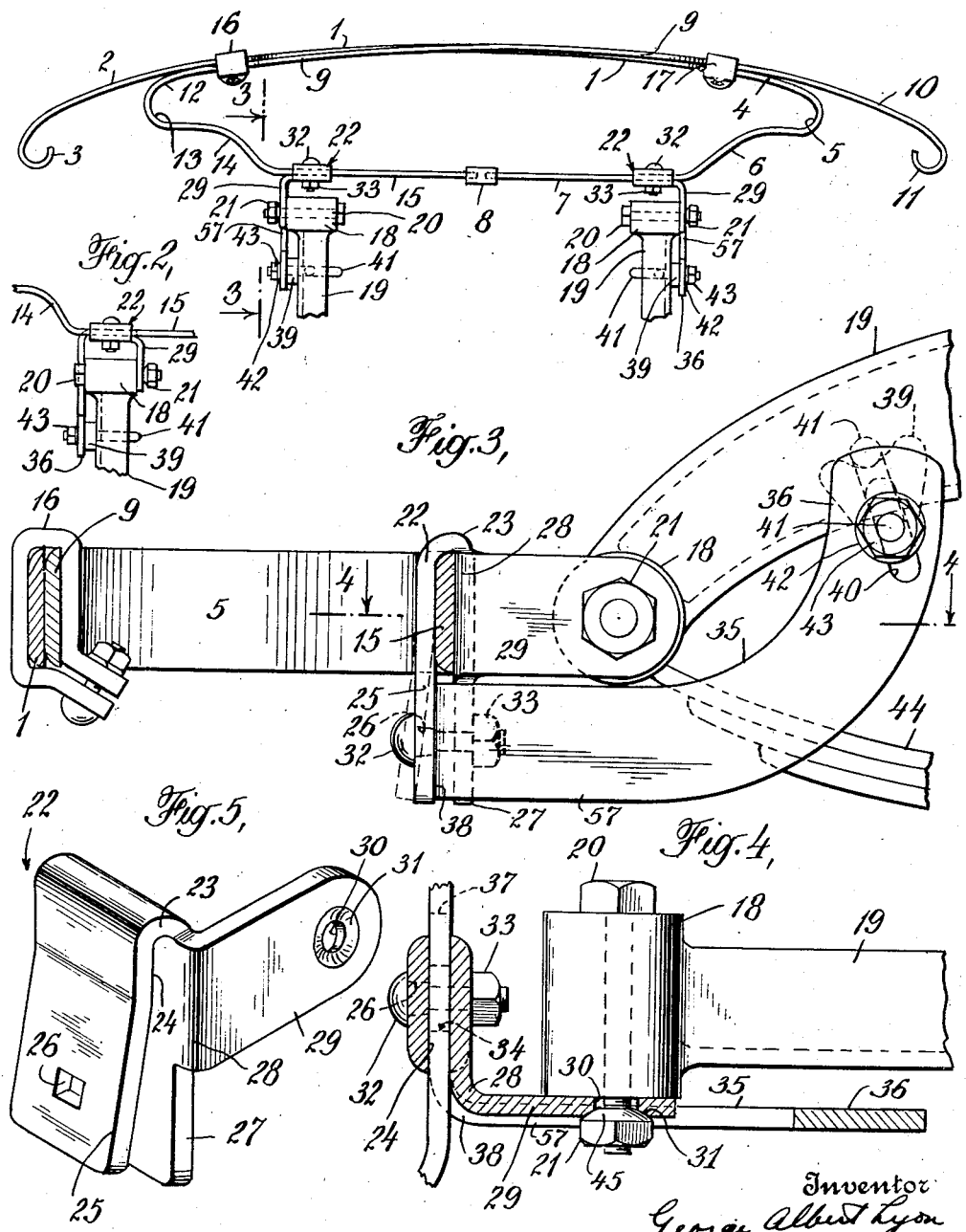

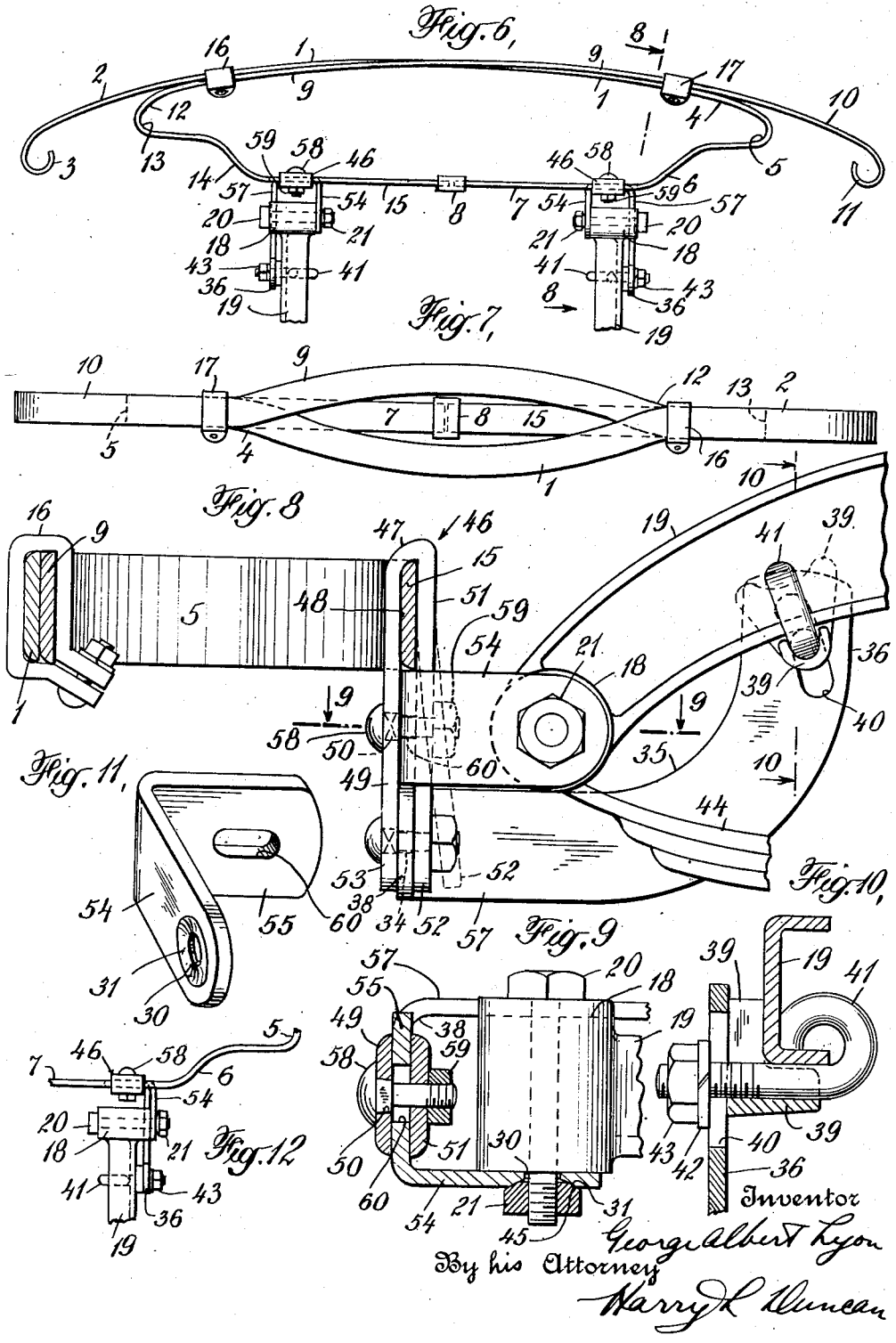

Patented July 28, 1925.

1,547,816

UNITED STATES PATENT OFFICE.

GEORGE ALBERT LYON, OF ALLENHURST, NEW JERSEY.

BUFFER-ATTACHING DEVICE.

Application filed October 15, 1923. Serial No. 668,543.

*To all whom it may concern:*

Be it known that I, GEORGE ALBERT LYON, a citizen of the United States, and resident of Allenhurst, county of Monmouth, State of New Jersey, have made a certain new and useful Invention Relating to Buffer-Attaching Devices, of which the following is a specification, taken in connection with the accompanying drawing, which forms part of the same.

This invention relates especially to automobile buffers and attaching devices therefor which comprise brackets to which one or more rear transverse members or portions of the buffer may be clamped so as to secure the same to the automobile frame members. Each bracket preferably comprises a pair of sheet steel members or bracket arms which have clamping faces or connecting portions extending laterally across the automobile and arranged in substantially vertical alignment one above another. A clamp which may be integral with one of these bracket arms or members is arranged to clamp them together and to the lateral supporting strip or member of the buffer which may, if desired, be arranged in substantially vertical alignment with respect to one or both of the lateral clamping or connecting members of the bracket arms. With this arrangement it is possible to have the bracket arms extend substantially horizontally rearward from their connecting or clamping portions so that there need be no substantially vertical overlap between these two bracket arms. This is advantageous because it enables the longer bracket arm, if desired, to be arranged vertically below the other and to extend below the frame end so as to be out of contact with lateral projections thereon, such as lubricating cups, etc. This long bracket arm may have its rear end upwardly extending or curved so as to bring its slotted or apertured securing end into the desired position to be securely clamped or bolted to the frame member of the automobile. The short bracket arm may, if desired, be substantially straight so as to extend rearward above the adjacent portion of the long bracket arm, and may be formed with clamping means of any suitable character such, for example, as a conical securing socket with which a connecting nut, preferably having a conical aligning face, may engage so that when this nut is screwed home on the spring bolt it tightly secures the bracket arm to the frame end.

In the accompanying drawing showing in a somewhat diagrammatic way various illustrative embodiments of this invention:

Fig. 1 is a top view showing a desirable form of automobile buffer and connecting brackets.

Fig. 2 is a similar detail view showing another form in which the brackets may be arranged.

Fig. 3 is an enlarged side view taken substantially along the line 3—3 of Fig. 1.

Fig. 4 is an enlarged top view taken along the line 4—4 of Fig. 3.

Fig. 5 is a perspective view showing the short bracket arm and clamp.

Fig. 6 is a top view showing another form of attaching brackets.

Fig. 7 is a front view thereof.

Fig. 8 is an enlarged side view taken along the line 8—8 of Fig. 6.

Fig. 9 is an enlarged top sectional view taken along the line 9—9 of Fig. 8.

Fig. 10 shows in detail the securing end of the bracket arm and its hook bolt and is taken along the line 10—10 of Fig. 8.

Fig. 11 is a perspective view showing the short bracket arm, and

Fig. 12 is a top view showing another arrangement of this bracket.

The illustrative buffer or bumper shown in Fig. 1 may, if desired, be formed of two similar steel strip members of hardened and tempered spring steel strip one-quarter to three-eighths of an inch thick and two to three inches wide more or less. Each of these buffer members may comprise a free end such as the rearwardly inclined strip end 2 which may extend outward to and end adjacent the lateral end of the buffer and be provided with a rounded or curved inturned end 3 at this point in some cases. This strip end may be integral with the front strip 1 which, as indicated in Figs. 1 and 7, may extend in bent or curved form below the other vertically displaced front strip 9 where vertically wide buffer front contact portions are desired. On the other side of the buffer front this front member 1 has a front connecting portion 4 and then curves outward and rearward in the form of an oppositely curved portion, if desired, so as to form a resilient supporting portion 4, 5, 6 of the buffer member to be connected in any desired way to the automobile. For this purpose the member may be formed with an inturned laterally extending supporting portion 7 of such length as to extend partly or entirely across between the frame members of the automobile to overlap or be connected with a similar laterally extending supporting portion 15 of the other buffer strip. This other or similar buffer strip may have a free end 10, 11 integral with the buffer front portion 9 which may be vertically bent or arched and formed with a front connecting portion 12 and with the curved resilient supporting portions 13, 14. The overlapped front connecting portions of the buffer members may be adjustably or otherwise connected in any suitable way as by the clamping devices 16, 17 which may be slipped down over the aligned buffer strips and then clamped upon them by the clamping bolts indicated or other suitable devices, see Fig. 7. The laterally extending rear supporting members or strips 7, 15 may be clamped in aligned or overlapping position by any suitable clamping device such as 8 which preferably allows at least a slight range of lateral adjustment between the buffer members.

The attaching devices or brackets may more or less enclose or rigidly engage these rear supporting members of the buffer and may comprise several bracket arms which may be rigidly clamped or secured to each of the automobile frame members at points a number of inches apart so that when the front ends of these bracket arms are rigidly connected together and to the buffer strips a strong and substantially rigid connection or supporting bracket is formed to which the buffer may be secured. As shown in Figs. 1, 3 and 4, both bracket arms may in some cases be arranged on the outside of the cooperating frame end of the automobile and of course these frame ends may have a lateral enlargement 18 connected to the channel section frame member 19 and provided with the usual spring bolt 20 by which the spring 44 is connected to the frame ends. It is especially desirable where the two cooperating bracket arms are arranged on the same side of the frame end, to have them arranged in vertically separated position so that they do not undesirably interfere with each other and for this purpose, as shown in Fig. 3, the long bracket arm 57 may be substantially straight where it extends rearward below the short bracket arm 29, and the frame end 18, and may then be formed with an upwardly extending curved securing portion or end 35, 36 in which one or more suitable apertures or slots 40 may be formed. In this way a considerable range of adjustment is provided between this securing end of the long bracket arm and the hook bolt 41 or other means of securing the same to the frame member 19. It is usually desirable to have a specially high or thick spacer block 39 used in connection with this hook bolt which when the nut 43 is screwed down on the lock washer 42, not only holds the bracket arm out of contact with projecting rivet heads etc. but also brings this long bracket arm where desired out substantially in vertical alignment with the outer face of the frame end 18 and the short bracket arm 29 secured thereto see Fig. 4, although in some cases this long bracket arm may extend further inward so as to be below the frame end. This arrangement makes it possible to have the bracket arms in substantially vertical parallel planes which is desirable for constructional purposes and for the sake of appearance, since the arms do not have to curve laterally outward around the frame end etc. The long bracket arm may be provided with a laterally bent clamping or connecting portion such as 38 which may have a suitable slot or aperture through which clamping bolts or devices may extend.

One of these bracket arms may have a clamp formed integral therewith by bending up the sheet steel or plate and, as shown in Fig. 5, this clamp 22 may be in many cases conveniently formed on the short bracket arm 29 by providing a laterally extending clamp back such as 27 and clamp top 23 and front 25 in which a polygonal or non-circular bolt hole 26 may be formed. In this way this clamp 22 may be stamped or forged of spring steel stock three-sixteenths or one-quarter of an inch thick, if desired, which may be hardened and tempered so as to more effectively engage and secure the cooperating members. In many cases it is advantageous to form the clamp with somewhat flaring depending clamp ends 25, 27 and, as illustrated, the clamp front may have a slight bend in its upper portion about in line with the numeral 24 in Fig. 5, so that the substantially vertical inner face 24 above this point is given an outward flare or inclination below. The clamp thus tends to assume the dotted line position shown in Fig. 3 and then when the nut 33 is tightened on the bolt 32 the clamp ends are brought together so as to contract the upper part of the clamp and definitely and strongly engage the buffer strip 15 within it as well as bring the clamp ends 25, 27 into close engagement with the opposite sides of the laterally extending connecting member 38 which may have an adjusting slot 34 and be formed on the long bracket arm 57 and also stiffen the clamp against bending. The clamp thus holds these two strips securely in substantially vertically aligned position and of course the buffer strip 15 prevents lateral movement of the front of these bracket arms to a considerable extent and thus stiffens and strengthens the bracket connections. The short bracket arm may be conveniently and effectively secured to the frame end by the spring bolt or in some cases, by a special spring bolt substituted therefor. The bracket arm may be formed with any suitable connecting means such as the conical securing socket 31 and bolt hole 30 which is of course preferably large enough to accommodate any standard size spring bolt used on the type of automobiles in question. A special connecting nut 21 which may have the conical aligning face 45 formed to cooperate with the socket 31, may be screwed on the end of this spring bolt 20 as shown in Fig. 4 and not only align the bracket arm with respect to the spring bolt, but secure ample and strong bearing between these conical surfaces so that the short bracket arm may thus be rigidly and definitely secured to the outer face of the frame end 18.

Fig. 2 shows another arrangement which may be used where the nut on the spring bolt is located on the inner face of the frame end 18. In this case the interchangeable short bracket arms and integral clamps may be reversed in position as compared to the Figs. 1 and 4 arrangement and when the short bracket arm which was used on the right hand frame end of Fig. 1 is transferred to the left frame end in the Fig. 2 arrangement, it may be secured to the right hand face of this frame end by the connecting nut 21 so as to bring the clamp 22 into the desired position substantially in front of the center of this frame end. This is a somewhat stronger and more desirable arrangement since it increases the distance between the points where the two bracket arms are connected to the frame, although in many cases it is of course undesirable to remove and reverse the spring bolt where its nut originally happens to be on the outside face of the frame end.

Figs. 6 and 8 show another form of attaching bracket in which the bracket arms are arranged on opposite sides of the frame as in Fig. 2. In this case the clamp is formed separate from each of the bracket arms so that the short bracket arm 54 which may have a similar bolt hole 30 and conical securing socket 31, may have a laterally extending connecting portion 55 in which a connecting slot 60 may be formed to accommodate the connecting or clamping bolt. The clamp 46 in this case is preferably formed of spring steel strip which may be hardened and tempered, if desired, and the two depending ends 52, 53 of the clamp are formed with suitable bolt holes such as 50 which are preferably polygonal or non-circular in one of these clamp ends so as to facilitate the tightening of the nuts 59 on
these clamping bolts 58. It is also desir-
able to have the clamp ends flare or diverge outwardly somewhat from about the point 51, as is shown in an exaggerated way in Fig. 8 so that when the lower ends of these clamps are brought together the clamp is brought strongly into contact with the cooperating buffer strip or bracket arm such as 15 which is thereby forced tightly against the inner face 48 of the clamp. It is, of course, understood that this clamp 46 may be spaced at its top 47 so as to have a downward curve on the front face particularly where the buffer strip 15 has a curved or rounded edge and this front face of the clamp is of course preferably substantially straight and vertical when the bolts are tightened into the position shown in Fig. 8 so that all three buffer and bracket arm connecting portions are thus securely and substantially rigidly held in vertical alignment one above the other which makes it possible to raise the buffer a couple of inches above the spring bolts where desired. By forming slots such as 60 in these laterally extending bracket arm connecting portions ample range of adjustment may be secured as indicated in Fig. 9 so as to compensate for different width frame ends. A similar slot 34 may be formed in the lateral extending portion 38 of the long bracket arm 57 where it is desired to bring the clamp more accurately into central position ahead of the frame end. Fig. 12 shows another arrangement which may be used where the spring bolt nuts are located on the outside of the frame ends so that it is desirable to have both the bracket arms outside the frame members. It is of course understood that these brackets may in some cases be used to secure a rear bumper to the rear frame ends of the automobile in which case the bracket arms would of course extend forward toward the frame members instead of rearward as in the case of the front buffers previously described.

This invention has been described in connection with a number of embodiments, forms, proportions, parts, arrangements, materials, methods of connection and use, to the details of which disclosure the invention is not of course to be limited, since what is claimed as new and what is desired to be secured by Letters Patent is set forth in the appended claims:

1. The automobile buffer attaching device consisting of a pair of brackets each comprising a short, substantially straight bracket arm adapted to extend rearward and provided with a bolt hole and cooperating means for connection to a spring bolt, an integral laterally extending bracket clamp formed on said bracket arm and having depending clamp ends formed with bolt holes and adapted to enclose and clamp two cooperating strips in substantially vertical alignment with each other, and a cooperating substantially flat long bracket arm having an apertured upwardly extending securing end adapted to be secured to the side of the automobile frame member and having a laterally extending connecting end adapted to extend between said clamp ends and formed with a bolt aperture, said long bracket arm being substantially straight adjacent said connecting end and adapted to extend substantially horizontally below the cooperating short bracket arm and frame end.

2. The automobile buffer attaching device consisting of a pair of brackets each comprising a short, substantially straight bracket arm adapted to extend rearward and provided with means for connection to a spring bolt, an integral laterally extending bracket clamp formed on said bracket arm and having depending clamp ends formed with bolt holes and adapted to clamp two cooperating strips in substantially vertical alignment with each other, and a cooperating substantially flat long bracket arm having an apertured upwardly extending securing end adapted to be secured to the side of the automobile frame member and having a laterally extending connecting end adapted to extend within said clamp, said long bracket arm being adapted to extend substantially horizontally below the cooperating short bracket arm and frame end.

3. The automobile buffer attaching bracket consisting of two bracket arms and comprising a short, substantially straight bracket arm adapted to extend rearward and provided with a bolt aperture for connection to a spring bolt, an integral laterally extending bracket clamp formed on said short bracket arm and having depending diverging clamp ends formed with bolt holes and adapted to enclose and clamp two cooperating strips in substantially vertical alignment with each other, and a cooperating long bracket arm having an apertured upwardly extending securing end and having a laterally extending connecting end adapted to extend within said clamp and formed with a bolt aperture, said long bracket arm being substantially straight adjacent said connecting end and being adapted to extend substantially horizontally below the cooperating short bracket arm and frame end.

4. The automobile buffer attaching bracket consisting of two bracket arms and comprising a short bracket arm adapted to extend rearward and provided with a bolt aperture for connection to a spring bolt, an integral laterally extending bracket clamp formed on said short bracket arm and having depending diverging clamp ends and adapted to enclose and clamp two cooperating strips in substantially vertical alignment with each other, and a cooperating long bracket arm having an apertured securing end and having a laterally extending connecting end adapted to extend within said clamp, said long bracket arm being substantially straight adjacent said connecting end.

5. The automobile buffer attaching bracket consisting of two cooperating bracket arms and comprising a short bracket arm provided with means for connection to a spring bolt, a laterally extending bracket clamp formed integral on one of said bracket arms and having depending clamp ends formed with bolt holes and adapted to enclose and clamp two cooperating strips in substantially vertical alignment with each other, and a cooperating long bracket arm having an apertured securing end adapted to be secured to the automobile frame member.

6. The automobile buffer attaching bracket consisting of two cooperating bracket arms and comprising a short bracket arm provided with means for connection to a spring bolt, a laterally extending bracket clamp formed integral on one of said bracket arms and adapted to clamp two cooperating strips in substantially vertical alignment with each other, and a cooperating long bracket arm having an apertured securing end adapted to be secured to the automobile frame member.

7. The automobile buffer attaching bracket arm formed of spring steel and provided with means for connection to the spring bolt, and an integral laterally extending bracket clamp having diverging separated clamp ends formed with bolt holes and adapted to enclose and clamp two cooperating strips in substantially vertical alignment with each other.

8. The automobile buffer attaching bracket arm formed of spring steel and provided with means for connection to the automobile frame member, and an integral laterally extending bracket clamp having separated clamp ends and adapted to enclose and clamp two cooperating strips in substantially vertical alignment with each other.

9. The automobile buffer attaching bracket consisting of two bracket arms comprising a short, substantially straight bracket arm provided with a bolt hole for connection to a spring bolt, a steel strip laterally extending bracket clamp adapted to connect said bracket arms and having depending clamp ends formed with bolt holes to enclose and clamp to cooperating strips in substantially vertical alignment with each other, the clamp front being forwardly flared at its lower end to bring its upper portion into forcible engagement with the cooperating strip when the clamp ends are bolted together, and a cooperating long bracket arm having a substantially straight portion adjacent said clamp and adapted to extend substantially horizontally below the cooperating short bracket arm and having an upwardly extending curved securing end formed with a bolt aperture.

10. The automobile buffer attaching bracket consisting of two bracket arms comprising a short bracket arm provided with a bolt hole for connection to a spring bolt, a laterally extending bracket clamp adapted to connect said bracket arms and having depending clamp ends formed with bolt holes to enclose and clamp two cooperating strips in substantially vertical alignment with each other, one clamp end diverging outward to bring its upper portion into forcible engagement with the cooperating strip when the clamp ends are bolted together, and a cooperating long bracket arm having a curved securing end formed with a bolt aperture.

11. The automobile buffer attaching device consisting of a pair of brackets each comprising a short bracket arm provided with means for connection to a spring bolt, a laterally extending bracket clamp connected to said bracket arm and adapted to clamp a plurality of cooperating strips in substantially vertical alignment with each other, and a connected long bracket arm having an apertured securing end adapted to be secured to a frame member, and a connected automobile buffer formed of two generally similar connected buffer members of wide thin spring steel strip each comprising a rear laterally extending securing portion secured within the clamp of one of said brackets and having a forwardly extending front contact portion connected to the contact portion of the other buffer member and having an outwardly extending free end formed with an inturned curved portion extending to and forming a lateral end of the buffer front.

12. The automobile buffer attaching device consisting of a pair of brackets each comprising a short bracket arm provided with means for connection to a spring bolt, a laterally extending bracket clamp connected to said bracket arms and adapted to clamp a plurality of cooperating strips in substantially vertical alignment with each other, and a connected long bracket arm having an apertured securing end adapted to be secured to a frame member, and a connected automobile buffer formed of two generally similar connected buffer members of wide thin spring steel strip each comprising a rear laterally extending securing portion secured to the clamp of one of said brackets and having a forwardly extending front impact portion and having an outwardly extending free end formed with an inturned curved portion extending to and forming a lateral end of the buffer front.

13. The automobile buffer formed of two generally similar connected buffer members of wide thin spring steel strip each comprising a rear laterally extending inturned securing portion clamped to the cooperating portion of the other member, and comprising a forwardly extending curved resilient portion and an integral vertically bent front impact portion connected to the impact portion of the other buffer member to form a vertically wide central impact face, and comprising an outwardly extending free end formed with an inturned curved portion extending to and forming a lateral end of the buffer front.

14. The automobile buffer formed of two connected buffer members of wide thin spring steel strip each comprising a rear laterally extending inturned securing portion, and comprising a forwardly extending curved resilient portion and an integral vertically bent front contact portion connected to the impact portion of the other buffer member to form a vertically wide central impact face, and comprising an outwardly extending free end formed with a curved portion extending to and forming a lateral end of the buffer front.

15. The automobile buffer formed of two generally similar connected buffer members of wide thin steel strip each comprising a rear laterally extending inturned securing portion connected to the cooperating portion of the other member, and comprising a forwardly extending curved resilient portion and an integral front impact portion connected to the contact portion of the other buffer member, and comprising an outwardly extending free end formed with a rearwardly curved inturned portion extending to and forming a lateral end of the buffer front.

16. The automobile buffer formed of two connected buffer members of wide thin steel strip each comprising a rear laterally extending inturned securing portion, and comprising a front impact portion connected to a front portion of the other buffer member, and comprising an outwardly extending free end formed with a rearwardly curved portion extending to and forming a lateral end of the buffer front.

GEORGE ALBERT LYON.